United States Patent
Choi

Patent Number: 5,940,360
Date of Patent: Aug. 17, 1999

[54] OPTICAL PICKUP DEVICE FOR REPRODUCING DISCS OF TWO TYPES WITH DIFFERENT DENSITIES BY DOUBLE BEAM FOCUSES OF DIFFERENT SIZES

[75] Inventor: Yang-Oh Choi, Seoul, Rep. of Korea

[73] Assignee: Daewoo Electronics Co., Ltd., Seoul, Rep. of Korea

[21] Appl. No.: 08/847,475

[22] Filed: Apr. 25, 1997

[30] Foreign Application Priority Data

| Apr. 26, 1996 | [KR] | Rep. of Korea | 96-13001 |
| Apr. 26, 1996 | [KR] | Rep. of Korea | 96-13014 |
| Apr. 26, 1996 | [KR] | Rep. of Korea | 96-13025 |

[51] Int. Cl.$^6$ .................................................. G11B 7/00
[52] U.S. Cl. .......................... 369/112; 369/109; 369/110; 369/44.37
[58] Field of Search .................................... 369/112, 109, 369/110, 44.23, 44.12, 44.24, 118

[56] References Cited

U.S. PATENT DOCUMENTS

| 5,172,369 | 12/1992 | Chikuma et al. | 369/112 |
| 5,325,348 | 6/1994 | Maeda et al. | |
| 5,353,273 | 10/1994 | Zavislan et al. | 369/121 |
| 5,483,508 | 1/1996 | Miyake et al. | 369/44.23 |
| 5,526,338 | 6/1996 | Hasman et al. | |
| 5,636,190 | 6/1997 | Choi | 369/44.23 |
| 5,646,929 | 7/1997 | Choi | 369/112 |
| 5,696,750 | 12/1997 | Katayama | 369/112 |
| 5,717,674 | 2/1998 | Mori et al. | 369/109 |

FOREIGN PATENT DOCUMENTS

0 486 060 A2   5/1992   European Pat. Off. .

*Primary Examiner*—Nabil Hindi
*Attorney, Agent, or Firm*—Jacobson, Price, Holman & Stern

[57] ABSTRACT

Beams generated from first and second laser light sources are reflected by a beam splitter to proceed toward an optical disc. The laser beams focus onto the optical disc via a selective light-transmitting part installed in front of the optical disc and an objective lens. The selective light-transmitting part is formed by an inner circular part for transmitting only the laser beam of first wavelength and a peripheral part for transmitting only the laser beam of second wavelength. The beam having transmitted through the inner circular part forms the larger beam spot on the disc while that having transmitted through the peripheral part forms the smaller beam spot, so that double beam focuses of different sizes can be formed by a single optical pickup device.

24 Claims, 5 Drawing Sheets

OPTICAL PICKUP DEVICE FOR REPRODUCING DISCS OF TWO TYPES WITH DIFFERENT DENSITIES BY DOUBLE BEAM FOCUSES OF DIFFERENT SIZES

BACKGROUND OF THE INVENTION

1. Field of the Invention

The present invention relates to an optical pickup device, and more particularly to an optical pickup device capable of reproducing discs of two types having different densities by double beam focuses of different sizes.

2. Description of the Prior Art

Information reproducing/recording systems for using optical discs such as laser discs or compact discs have been developed in recent years. Such optical discs have a variety of information, e.g., generally, a digital audio disc is associated with the reproducing of musical sounds and a digital video disc is with the reproducing of images. These discs are recorded with information at a proper recording density in accordance with the purpose of usage. For example, the digital audio disc for reproducing musical sounds is recorded with smaller density, and the digital video disc for reproducing images is with larger density, e.g., as many as four times. The information stored into the inside of the above-mentioned discs is readable/writable by means of optical pickup devices, and can reproduce the discs of different kinds having different densities by means of optical pickup devices of different kinds.

A construction and operation of a general optical pickup device is disclosed in U.S. Pat. Nos. 4,767,921 or 4,868,377.

The conventionally general optical pickup device will be described in detail with reference to FIG. 1 below.

Figure 1:
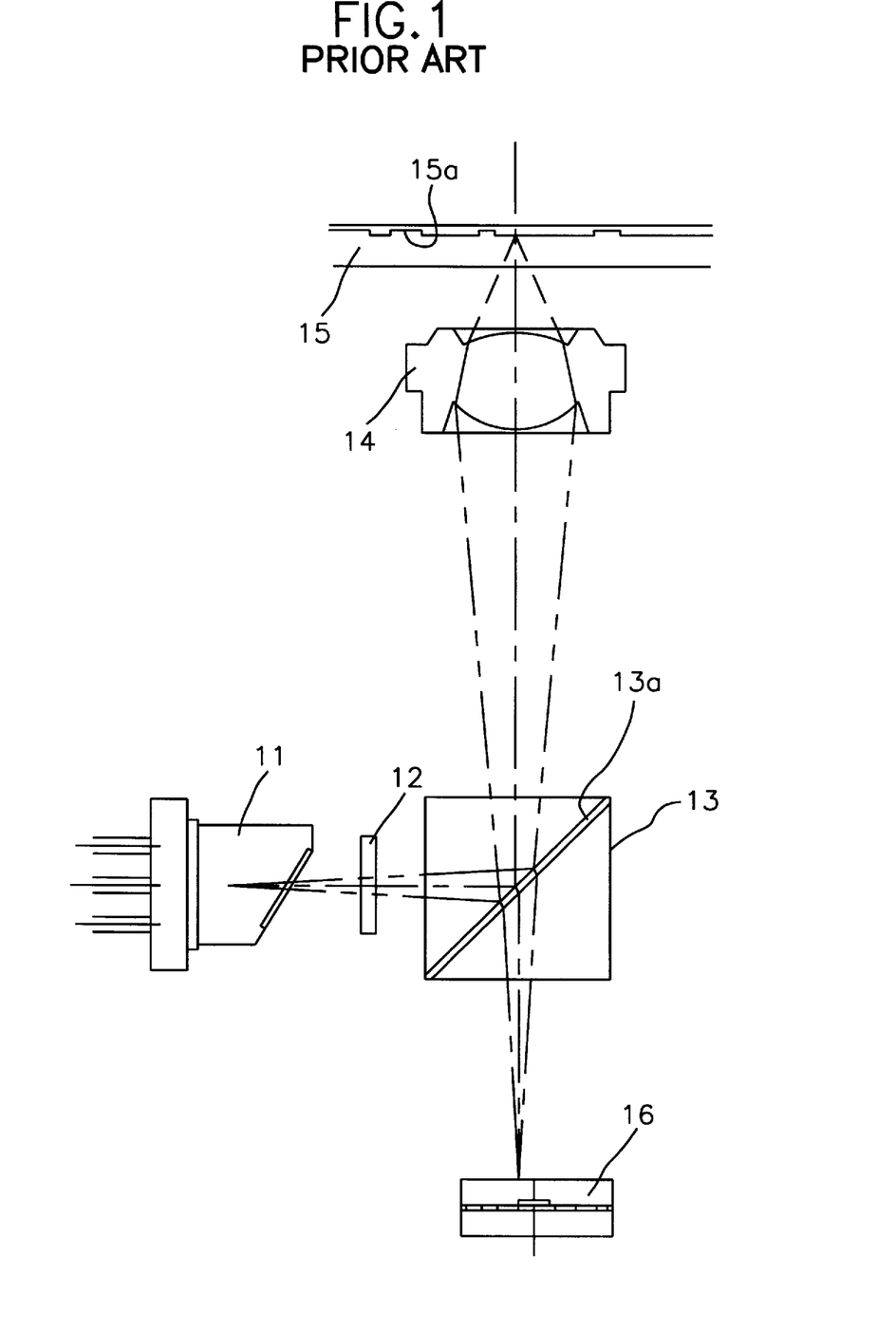
FIG. 1 is a schematic view showing a conventional optical pickup device.

FIG. 1 is a schematic view showing the conventionally general optical pickup device. In FIG. 1, a reference numeral 11 denotes a light source for generating a laser beam, which is a laser diode 11. The laser beam emitted from laser diode 11 is diffracted while transmitting through a diffraction grating 12. The diffracted beam proceeds toward a beam splitter 13.

Here, beam splitter 13 is provided in such a manner that two right-angled prisms are installed to oppose to each other against respective inclination planes of 45°, and a coating layer 13a is formed along the contacting portion of the prisms, thereby transmitting some of the incident beam and reflecting the other incident beam to be perpendicular to the incident beam while securing the property of travelling straight for the incident beam.

The diffracted beam is reflected toward optical disc 15 by means of beam splitter 13. The beam reflected from beam splitter 13 focuses onto a recording plane 15a of an optical disc 15 while passing through an objective lens 14 installed in front of a recording medium such as optical disc 15. A positional accuracy, i.e., focusing error and tracking error, of the pickup device with respect to optical disc 15 is detected from an image of the beam received into a photodetector 16, and therefore, the focusing and tracking are controllable. Also, the information is read out on the basis of the amount of the reflected light determined by pits in recording plane 15a of optical disc 15.

Meantime, if the recording capacity of the disc is to be four times like the digital video disc the digital audio disc, the width of pits in the disc is consequently decreased by ½. For this reason, a focused spot size onto the digital video disc should be half of that onto the digital audio disc with the consequence of necessarily employing different optical pickup devices in reproducing the digital video disc and digital audio disc by means of the conventional optical pickup devices. That is, in order to accurately read out data respectively recorded on the digital audio disc and digital video disc, it is required to separately apply an optical pickup device for digital audio disc of which beam spot size is approximately 1.6 $\mu$m when focusing onto the digital audio disc and an optical pickup device for digital video disc of which beam spot size is approximately 0.8 $\mu$m when focusing onto the digital video disc.

SUMMARY OF THE INVENTION

Therefore, it is an object of the present invention to provide an optical pickup device capable of reproducing discs of two kinds having different densities by forming double beam focuses of different sizes.

To achieve the above object of the present invention, an optical pickup device includes first and second laser light sources for respectively generating laser beams of first and second wavelengths, and a beam splitter arranged onto an optical path of the beams generated from the first and second laser light sources for partially reflecting and partially transmitting the first and second laser beams such that the laser beam is partially reflected toward an optical disc and the beam incident after being reflected from the optical disc is partially transmitted. Also, a selective light-transmitting part has an inner circular part for transmitting only the laser beam of first wavelength and a peripheral part for transmitting only the laser beam of second wavelength. Additionally, an objective lens leads the laser beam proceeding toward the optical disc to focus onto the optical disc, and a light-receiving part receives the laser beam reflected from the optical disc.

Preferably, the selective light-transmitting part may be a circular light-transmitting plate of which peripheral part is shaped as a ring.

Here, the first and second laser light sources are positioned opposite to each other by interposing the beam splitter between them. The beam splitter has two planes forming right angles with each other such that the two planes respectively face with the first and second laser light sources. By this construction, the beams radiated from the first and second laser light sources are perpendicularly reflected to advance in the same direction, the optical disc is arranged onto the path of the advancing beam, and a photodetector is arranged onto the path of the beam for allowing the beam reflected from the optical disc to return to the beam splitter and for allowing the returned beam to be received into the photodetector after being transmitted through the beam splitter.

A difference between spot sizes focusing on the disc is adjustable by properly regulating an outermost angle of incidence of the laser beam which is transmitted through the inner circular part of the selective light-transmitting part.

Also, the difference between the spot sizes focusing on the disc is adjustable by properly selecting the wavelengths of the laser beam.

More preferably, first and second diffraction gratings are respectively installed between the first and second laser light sources and the beam splitter for controlling tracking and focusing.

As another aspect of the present invention, an optical pickup device includes a first hologram device which has a first laser light source for generating laser beam of first wavelength, a first hologram grating for transmitting the beam emitted from the first laser light source and diffracting to radiate the beam incident after being reflected from an optical disc, and a first photodetector for receiving the beam diffracted by the first hologram grating. In addition, a second hologram device has a second laser light source for generating laser beam of second wavelength, a second hologram grating for transmitting the beam emitted from the second laser light source and diffracting to radiate the beam incident after being reflected from the optical disc, and a second photodetector for receiving the beam diffracted by the second hologram grating. Also, a beam splitter is arranged onto an optical path of the beams generated from the first and second laser light sources for reflecting the laser beam of first wavelength and transmitting the laser beam of second wavelength. Thus, the laser beam of first wavelength is reflected and the laser beam of second wavelength is transmitted to form an identical beam which then proceeds toward the optical disc, and the beam reflected from the optical disc is returned to the beam splitter. After this, the laser beam of first wavelength in the returned beam is to be received into the first photodetector after being reflected from the beam splitter and the laser beam of second wavelength in the returned beam is to be received into the second photodetector after being reflected from the beam splitter. A selective light-transmitting part installed in front of the optical disc is formed by an inner circular part for transmitting only the laser beam of first wavelength and a peripheral part for transmitting only the laser beam of second wavelength, and an objective lens leads the laser beam advancing toward the optical disc to focus onto the optical disc.

Preferably, the beam splitter may have a property of totally reflecting the beam of first wavelength and totally transmitting the beam of second wavelength.

Otherwise, the beam splitter may have a property of partially reflecting and partially transmitting the incident beam.

A first diffraction grating is installed between the first laser light source and first hologram grating within the second hologram device for controlling tracking and focusing.

Also, a second diffraction grating is installed between the second laser light source and second hologram grating within the second hologram device for controlling tracking and focusing.

As still another aspect of the present invention, an optical pickup device includes a hologram device which has a first laser light source for generating laser beam of first wavelength, a second laser light source for generating laser beam of second wavelength, a hologram grating for transmitting the beam emitted from the first and second laser light sources and diffracting to radiate the beam incident after being reflected from an optical disc, and a photodetector for receiving the beam diffracted by the hologram grating. Also, a selective light-transmitting part installed in front of the optical disc is formed by an inner circular part for transmitting only the laser beam of first wavelength and a peripheral part for transmitting only the laser beam of second wavelength, and an objective lens leads the laser beam advancing toward the optical disc to focus onto the optical disc.

A diffraction grating may be installed between the laser light source and first hologram grating of the hologram device for controlling tracking and focusing.

According to the optical pickup device of the present invention as described above, when the first and second laser beams of different wavelengths transmit through the selective light-transmitting part, the laser beam of first wavelength having transmitted through the inner circular part forms the larger beam spot onto the disc and the laser beam of second wavelength having transmitted through the peripheral part forms the smaller beam spot. By doing so, double beam focuses of different sizes can be formed by the use of the single optical pickup device, thereby making it possible to reproduce discs of two types with different densities by means of the single optical pickup device.

As a result, in case of the digital audio disc and digital video disc having different recording capacities from each other, both discs can be reproduced when employing the optical pickup device according to the present invention.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

An optical pickup device according to the present invention will be described in detail with reference to accompanying drawings.

Embodiment 1

Figure 2:
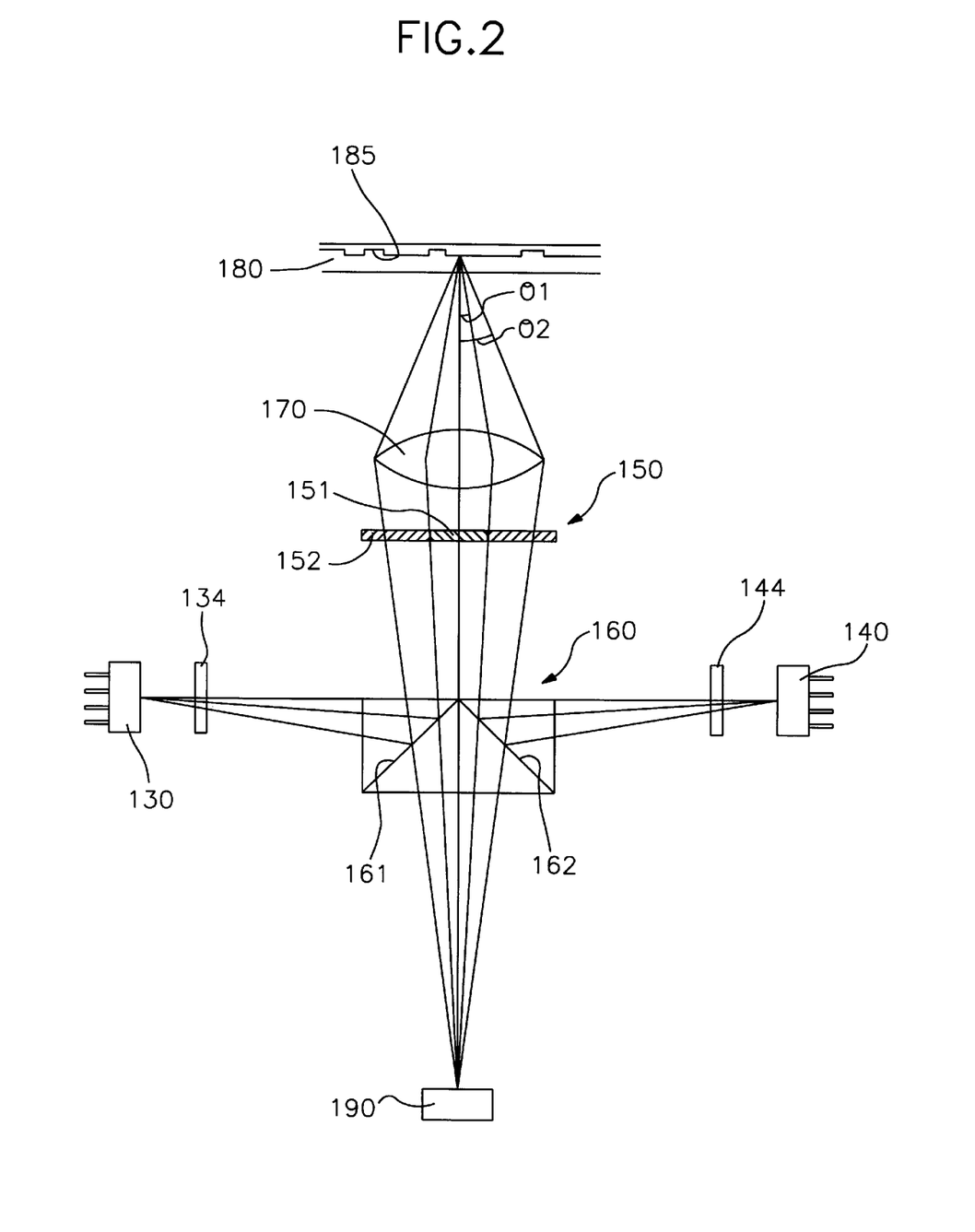
FIG. 2 is a schematic view showing an optical pickup device according to a first embodiment of the present invention.

FIG. 2 is a schematic view showing the optical pickup device according to a first embodiment of the present invention.

In this embodiment, as shown in FIG. 2, is installed first and second laser diodes 130 and 140 as light sources that generate laser beams for respectively generating laser beams of first and second wavelengths.

Here, a beam splitter 160 is disposed onto an optical path of the beams generated from first and second laser diodes 130 and 140. In more detail, first and second laser diodes 130 and 140 are arranged to opposite to each other by interposing beam splitter 160 shaped as a rectangular cubic bar, and two coating layers 161 and 162 are provided within beam splitter 160 while forming a right angle. Two coating layers 161 and 162 which are perpendicular to each other are disposed to face with first and second laser diodes 130 and 140, respectively, so that the beams emitted from first and second laser diodes 130 and 140 are reflected at right angles with respect to the direction of incidence to proceed in the same direction. Two coating layers 161 and 162 of beam splitter 160 in the right-angled relation constitute a plane for partially reflecting and partially transmitting the first and second laser beams. In other words, while securing the straight travelling property of the incident beam, some of the incident beam is transmitted and the other incident beam is reflected at right angles with the direction of the incident beam. Thus, two coating layers 161 and 162 partially reflect the laser beams emitted from first and second laser diodes 130 and 140 toward an optical disc 180 and partially transmit the beam returning after being reflected from optical disc 180.

In order to control tracking and focusing, first and second diffraction gratings 134 and 144 are respectively installed between first & second laser diodes 130 & 140 and beam splitter 160.

Optical disc 180 is placed onto the path of the beam which is reflected to proceed.

A selective light-transmitting part 150 is installed in front of optical disc 180. Selective light-transmitting part 150 consists of an inner circular part 151 that transmits only the laser beam of first wavelength and a peripheral part 152 that transmits only the laser beam of second wavelength. Selective light-transmitting part 150 may be preferably formed by a circular light-transmitting plate of which peripheral portion 152 is in the form of a ring.

An objective lens 170 is installed between optical disc 180 and selective light-transmitting part 150 for permitting the beam transmitted through selective light-transmitting part 150 to focus onto a recording plane 185 of optical disc 180.

Here, the second wavelength is set to be smaller than the first wavelength.

Hereinafter, an operation according to the foregoing embodiment will be described.

The laser beams are generated from first and second laser diodes 130 and 140 toward beam splitter 160. The lasers beams are divided into three beams while transmitting through first and second diffraction gratings 134 and 144.

The divided beams are incident on beam splitter 160 to have an angle of incidence of 45° onto right-angled coating layers 161 and 162 installed within beam splitter 160. The beams are partially transmitted and partially reflected at right angles with respect to the incident light by means of two coating layers 161 and 162. Then, two beams are put together as the identical beam to advance toward optical disc 180.

The combined beam passes through selective light-transmitting part 150 installed in front of optical disc 180. The beam of first wavelength in the combined beam transmits through only inner circular part 151 of selective light-transmitting part 150, and the beam of second wavelength transmits through only peripheral part 152 of selective light-transmitting part 150.

The transmitted beam is to focus onto recording plane 185 of optical disc 180 by means of objective lens 170 installed between optical disc 180 and selective light-transmitting part 150.

At this time, the laser beam of first wavelength transmits through inner circular part 151 of the circular light-transmitting plate, i.e., selective light-transmitting part 150, and passes through objective lens 170 prior to focusing onto optical disc 180 at an angle of θ1. At the same time, the laser beam of second wavelength transmits through peripheral part 152 of circular light-transmitting plate 150 and passes through objective lens 170 prior to focusing onto optical disc 180 at an angle of θ2.

Accordingly, two different numerical apertures (N.A.) are produced by inner circular part 151 and peripheral part 152 of circular light-transmitting plate 150. By these two different numerical apertures, two beam spots of different sizes are formed onto optical disc 180. Due to this fact, a difference appears in the quantities of light.

That is, N.A.1=$\eta$ sin θ1 and N.A.2=$\eta$ sin θ1 (where θ denotes a refractive index of a medium, and $\eta$ is an angle formed between an optical axis and outermost incident beam).

At this time, a diameter of the beam $W_0$ is written as: $W_0$=K*λ/N.A. (where K is a constant), and $D_0$ (focal depth)=R*λ/(N.A.)$^2$ (where R is a constant).

Thus, along with the change of the numerical aperture, the beam size and focal depth become changed.

Therefore, the beam focusing by the outermost angle of incidence θ2 after passing through peripheral part 152 of circular light-transmitting plate 150 has smaller beam size and focal depth than those of the beam focusing by the outermost incident angle θ1 by objective lens 170 after passing through inner circular part 151. This is because the beam size is in inverse proportion to N.A. and the focal depth is in inverse proportion to (N.A.)$^2$. As the result, the difference between the spot sizes focusing onto the disc is adjustable by appropriately selecting the outermost angle of incidence of the beams.

Also, by considering the fact that the beam size and focal depth are in proportion to λ, the second wavelength is set to be smaller than the first wavelength. By doing so, the spot size onto the optical disc formed by the laser beam of second wavelength passing through peripheral part 152 is formed to be smaller than that of the laser beam of first wavelength passing through inner circular part 151. The difference between the spot sizes focusing onto the disc is adjustable by properly selecting the wavelength.

Thus, the laser beam of first wavelength focusing at the angle of θ1 by objective lens 170 after transmitting through inner circular part 151 of circular light-transmitting plate 150 forms the beam spot of 1.6 μm size onto optical disc 180, and the laser beam of second wavelength focusing at the angle of θ2 by objective lens 170 after transmitting through peripheral part 152 forms the beam spot of 0.8 μm size onto optical disc 180. By this operation, the laser beam of first wavelength which forms the beam spot of 1.6 μm size can reproduce the digital audio disc with the wider pits, and the laser beam of second wavelength which forms the beam spot of 0.8 μm size can reproduce the digital video disc with the narrower pits.

When optical disc 180 is the digital audio disc, the laser beam focusing at the angle of θ1 transmits through inner circular part 151 of circular light-transmitting plate 150 via objective lens 170 to return to beam splitter 160. The returned beam having optical information partially transmits through first and second coating layers 161 and 162 to be received into a photodetector 190 installed to the lower portion of beam splitter 160, and is thus demodulated into an original signal.

Also, when optical disc 180 is the digital video disc, the laser beam focusing at the angle of θ2 transmits through inner circular part 152 of circular light-transmitting plate 150 via objective lens 170 to be returned to beam splitter 160. The returned beam having optical information partially transmits through first and second coating layers 161 and 162 to be received into photodetector 190 installed to the lower portion of beam splitter 160, and is thus demodulated into an original signal.

Embodiment 2

Figure 3:
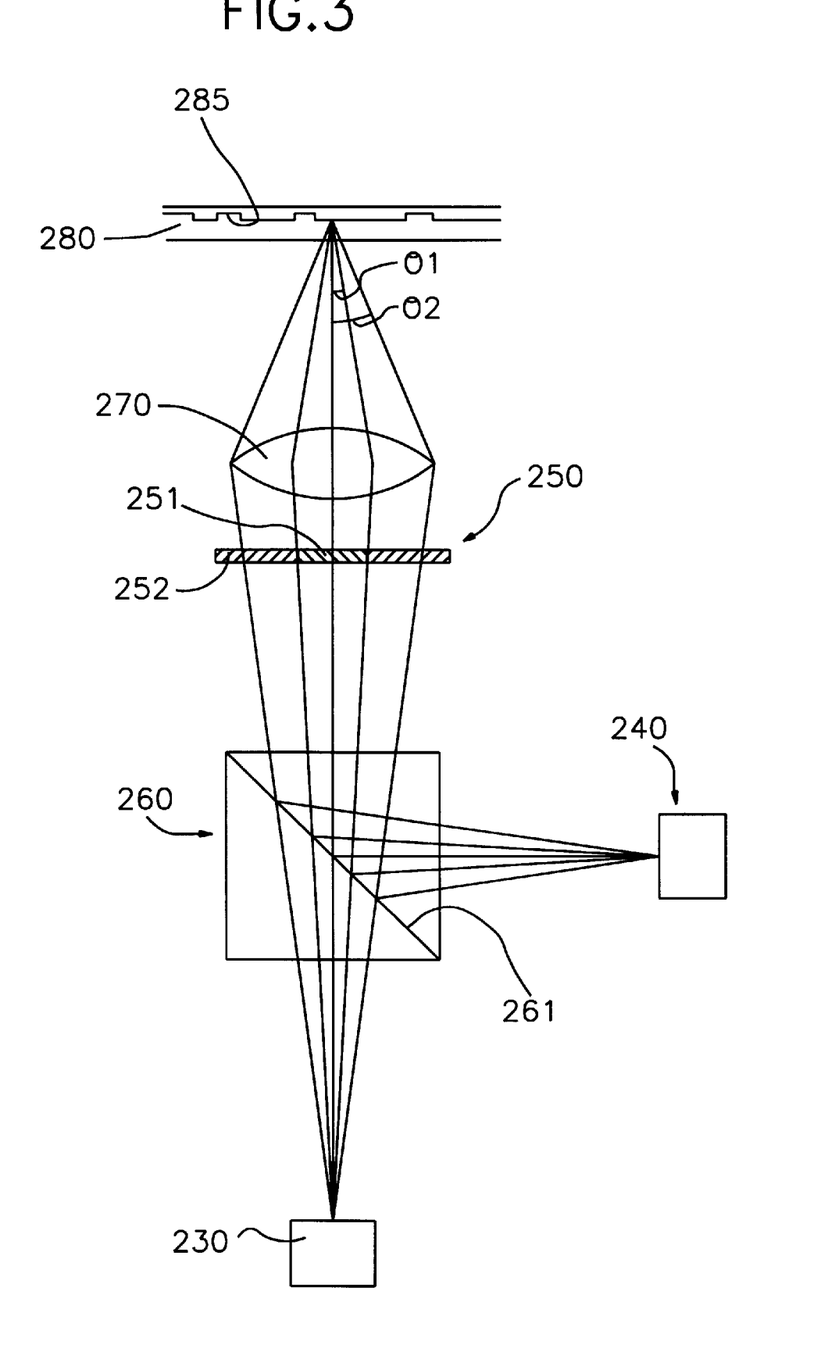
FIG. 3 is a schematic view showing the optical pickup device according to a second embodiment of the present invention.
Figure 4:
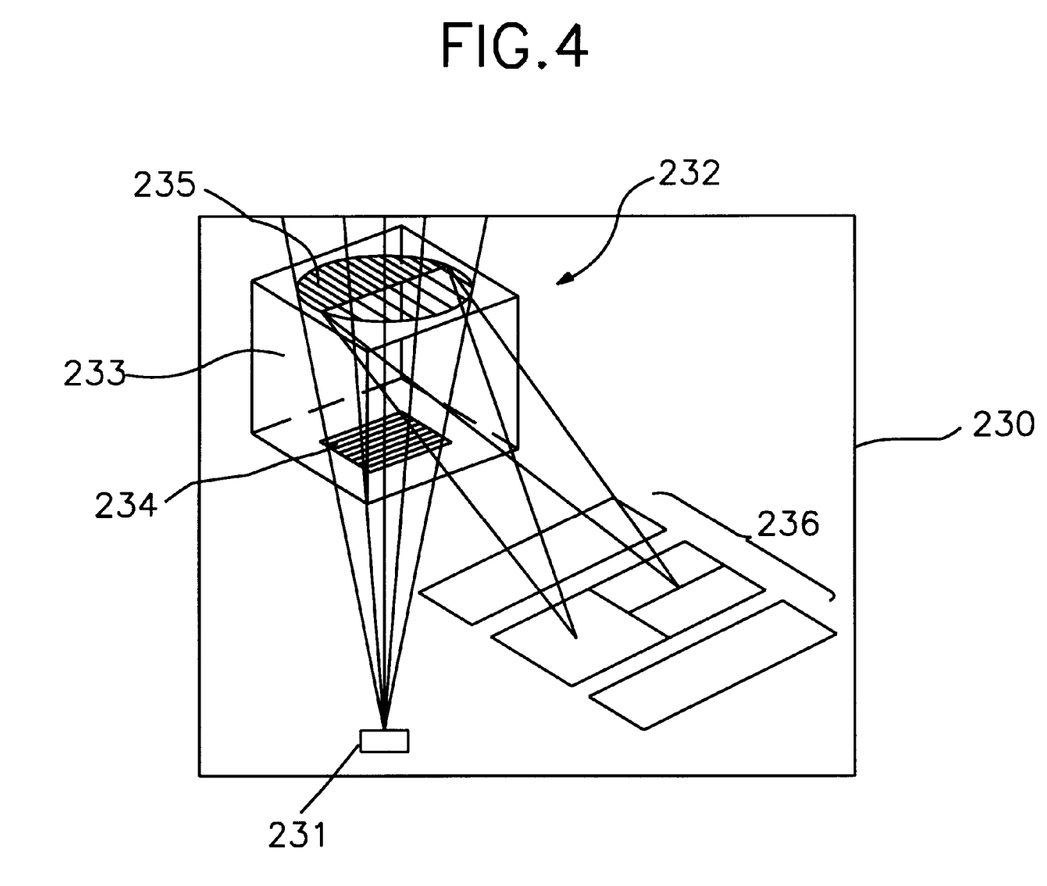
FIG. 4 is a detailed view showing the inside of the hologram device in the optical pickup device according to the second embodiment of the present invention.

FIG. 3 is a schematic view showing the optical pickup device according to a second embodiment of the present invention, and FIG. 4 is a detailed view showing the inside of the hologram device in the optical pickup device according to the second embodiment of the present invention.

In this embodiment, as shown in FIGS. 3 and 4, is installed a first hologram device 230 which includes a first laser diode 231 for generating laser beam of first wavelength, a first hologram grating 235 which transmits the beam emitted from first laser diode 231 and diffracts to radiate the beam incident after being reflected from an optical disc 280, and a first photodetector 236 for receiving the beam diffracted by first hologram grating 235.

In addition, a second hologram device 240 includes a second laser diode 242 for generating laser beam of second wavelength, a second hologram grating 245 for transmitting the beam emitted from second laser diode 241 and diffracts to radiate the beam incident after being reflected by optical disc 280, and a second photodetector 246 for receiving the beam diffracted by second hologram grating 245.

A beam splitter 260 is arranged onto an optical path of the beams generated from first and second laser diodes 231 and 241. A coating layer 261 is formed within beam splitter 260, which may be a plane for reflecting the laser beam of first wavelength and transmitting the laser beam of second wavelength. As another instance, coating layer 261 may be a plane which partially reflects and partially transmits the beams.

By positioning the first hologram device 230 and second hologram device 240 to be perpendicular to each other centering about coating layer 261 by beam splitter 260, the laser beams of first wavelength and second wavelength are incident on coating layer 261 at the angle of incidence of 45°, respectively. Thereafter, two beams are put together to form the identical beam to advance toward optical disc 280.

In order to control the tracking and focusing, first and second diffraction gratings 234 and 244 are respectively installed between first laser diode 231 and first hologram grating 235 within first hologram device 230 and between second laser diode 241 and second hologram grating 245 within second hologram device 240.

A selective light-transmitting part 250 is installed in front of optical disc 280. Selective light-transmitting part 250 consists of an inner circular part 251 that transmits only the laser beam of first wavelength and a peripheral part 252 that transmits only the laser beam of second wavelength. Selective light-transmitting part 250 may be preferably formed by a circular light-transmitting plate of which peripheral portion 252 is shaped as a ring.

An objective lens 270 is installed between optical disc 280 and selective light-transmitting part 250 for permitting the beam having transmitted through selective light-transmitting part 250 to focus onto a recording plane 285 of optical disc 280.

Here, the first wavelength is set to be larger than the second wavelength.

Hereinafter, an operation according to the foregoing embodiment will be described.

The laser beams are generated from first and second laser diodes 231 and 241 within first and second hologram devices 230 and 240 toward beam splitter 260 in a direction perpendicular to each other. The laser beams are divided into three beams by first and second diffraction gratings 234 and 244.

The divided beams are incident on beam splitter 160 while being perpendicular to one another. The beams are incident on coating layer 261 installed within beam splitter 260 to have an angle of incidence of 45°. Since the incident beams are partially transmitted and the other incident beams are partially reflected at right angles with respect to the incident light by means of coating layer 261, the partially-transmitted beam from first laser diodes 231 and the partially-reflected beam from second laser diode 232 are put together as the identical beam to advance toward optical disc 280.

Here, the coating layer may be provided by a plane which totally transmits the beam of first wavelength and totally reflects the beam of second wavelength, and it will be appreciated that several other diversities may be acceptable.

The combined beam passes through selective light-transmitting part 250 installed in front of optical disc 280. The beam of first wavelength in the combined beam transmits through only inner circular part 251 of selective light-transmitting part 250, and the beam of second wavelength transmits through only peripheral part 252 of selective light-transmitting part 250.

The transmitted beam is to focus onto recording plane 285 of optical disc 280 by means of objective lens 270 installed between optical disc 280 and selective light-transmitting part 250.

At this time, the laser beam of first wavelength transmits through inner circular part 251 of circular light-transmitting plate 250 and passes through objective lens 270 prior to focusing onto optical disc 280 at an angle of θ1. At the same time, the laser beam of second wavelength transmits through peripheral part 252 of circular light-transmitting plate 250 and passes through objective lens 270 prior to focusing onto optical disc 280 at an angle of θ2.

Accordingly, two different numerical apertures (N.A.) are produced by inner circular part 251 and peripheral part 252 of circular light-transmitting plate 250. Thus, the beams focus onto optical disc 280 while forming respective beam spots of 0.8 μm and 1.6 μm sizes.

The beams are returned to beam splitter 260 after being reflected from optical disc 280, in which the laser beam of first wavelength that has formed the beam spot of 1.6 μm size in the returned beam is partially transmitted through beam splitter 260 to be refracted by first hologram grating 235 within first hologram device 230, so that it is received into first photodetector 236 to make it possible to reproduce the digital audio disc. The laser beam of second wavelength that has formed the beam spot of 0.8 μm size is partially reflected from beam splitter 260 to be diffracted by second hologram grating 245 within second hologram device 240, so that it is received into second photodetector 246 to make it possible to reproduce the digital video disc.

Embodiment 3

Figure 5:
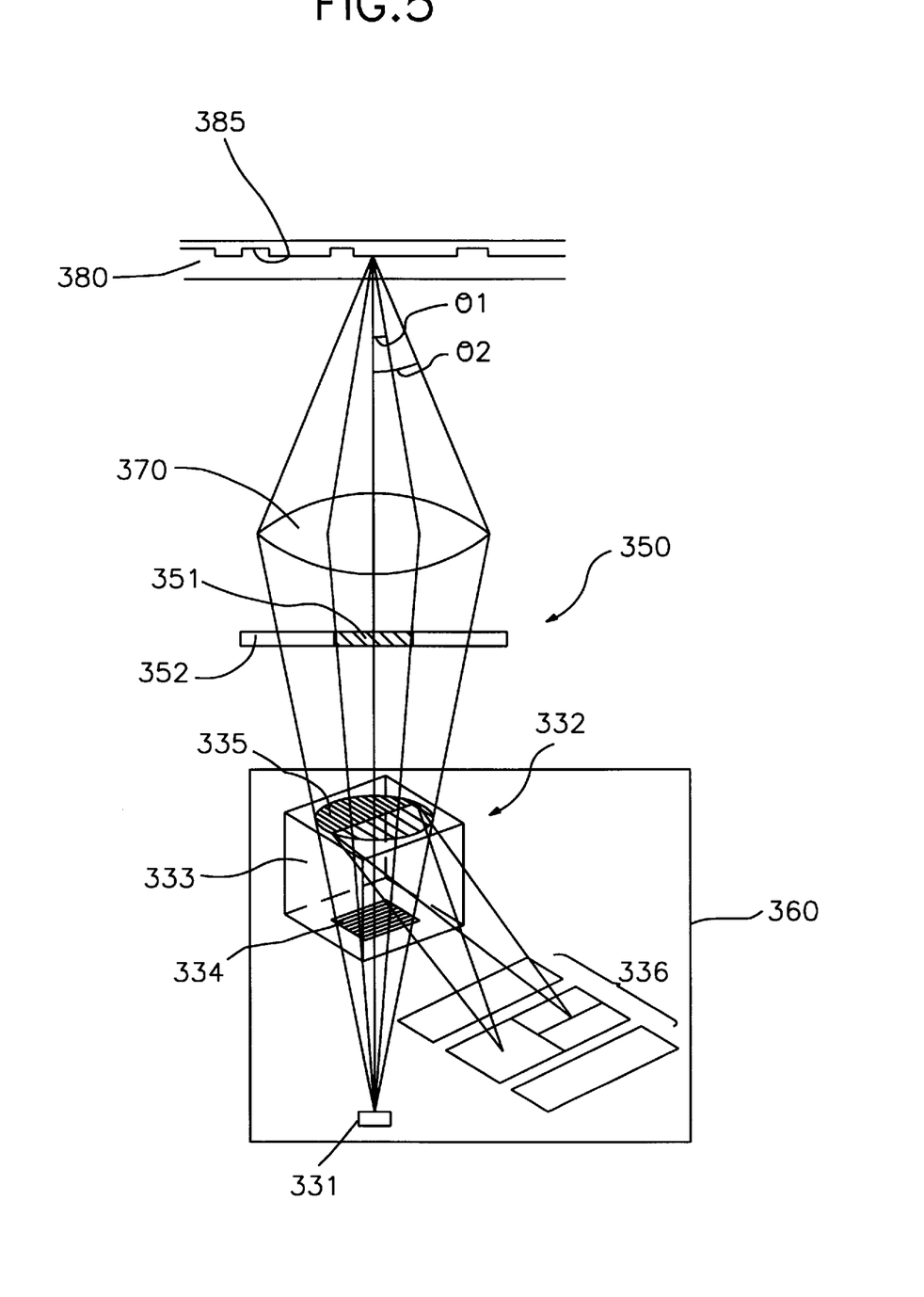
FIG. 5 is a schematic view showing the optical pickup device according to a third embodiment of the present invention.

FIG. 5 is a schematic view showing the optical pickup device according to a third embodiment of the present invention.

In this embodiment, as shown in FIG. 5, is installed a hologram device 330 which includes a laser diode 331 for simultaneously generating laser beams of first wavelength and second wavelength, a hologram grating 335 for transmitting the beam emitted from laser diode 331 and diffracting to radiate the beam incident after being reflected from an optical disc 380, a photodetector 336 disposed to one side of laser diode 331 for receiving the beam diffracted by hologram grating 335 and a diffraction grating 334 arranged between laser diode 331 and hologram grating 335 for controlling the tracking and focusing.

A selective light-transmitting part 350 is arranged onto an optical path of the beams generated from laser diode 331.

Selective light-transmitting part 350 consists of an inner circular part 351 that transmits only the laser beam of first wavelength and a peripheral part 352 that transmits only the laser beam of second wavelength. Selective light-transmitting part 350 is preferably formed by a circular light-transmitting plate of which peripheral portion 352 is shaped as a ring.

An objective lens 370 is installed between optical disc 380 and selective light-transmitting part 350 for permitting the beam having transmitted through selective light-transmitting part 350 to focus onto a recording plane 385 of optical disc 380.

Here, the first wavelength is set to be larger than the second wavelength.

Hereinafter, an operation according to the foregoing embodiment will be described.

The laser beams of first and second wavelengths are generated from laser diode 331 within hologram device 330 toward a beam splitter 360. The laser beams are divided into three beams by means of diffraction grating 334.

The divided beams pass through selective light-transmitting part 350 installed in front of optical disc 380. The beam of first wavelength in the beam transmits through only inner circular part 351 of selective light-transmitting part 350, and the beam of second wavelength transmits through only peripheral part 352 of selective light-transmitting part 350.

The transmitted beam is to focus onto recording plane 385 of optical disc 380 by means of objective lens 370 installed between optical disc 380 and selective light-transmitting part 350.

At this time, the laser beam of first wavelength transmits through inner circular part 351 of circular light-transmitting plate 350 and passes through objective lens 370 prior to focusing onto optical disc 380 at an angle of θ1. At the same time, the laser beam of second wavelength transmits through peripheral part 352 of circular light-transmitting plate 350 and passes through objective lens 370 prior to focusing onto optical disc 380 at an angle of θ2.

Thus, the beams focus while forming respective beam spots of 1.6 μm and 0.8 μm onto optical disc 380.

The beams return to hologram device 330 after being reflected from optical disc 380, and the returned beam is diffracted to be received into photodetector 336. Thus, the laser beam of second wavelength which have formed the beam spot of 0.8 μm size can reproduce the digital video disc. Whereas, the laser beam of first wavelength which have formed the beam spot of 1.6 μm size in the received beam can reproduce the digital audio disc.

According to the optical pickup device of the present invention as described above, when the first and second laser beams of different wavelengths transmit the selective light-transmitting part, the laser beam of first wavelength having transmitted through the inner circular part forms the larger beam spot onto the disc while the laser beam of second wavelength having transmitted through the peripheral part forms the smaller beam spot. By this operation, the double beam spots of different sizes can be formed by using the single optical pickup device to make it possible to reproduce the discs of two types having different densities by the use of the single optical pickup device.

As a result, in case of the digital audio disc and digital video disc which have different recording densities from each other, both discs can be reproduced when using the optical pickup device according to the present invention.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup device for reproducing discs of two types with different densities by double beam focuses of different sizes comprising:

first and second laser light sources for respectively generating laser beams of first and second wavelengths;

a beam splitter arranged onto an optical path of said beams generated from said first and second laser light sources for partially reflecting and partially transmitting said first and second laser beams such that said laser beam is partially reflected toward an optical disc and said beam incident after being reflected from said optical disc is partially transmitted;

a selective light-transmitting part including an inner circular part for transmitting only said laser beam of first wavelength and a peripheral part for transmitting only said laser beam of second wavelength, wherein a difference between spot sizes focusing on said disc is adjustable by properly regulating an outermost angle of incidence of said laser beam which is transmitted through the inner circular part of the selective light-transmitting part;

an objective lens for focusing said laser beam proceeding toward said optical disc onto said optical disc; and light-receiving means for receiving said laser beam reflected from said optical disc.

2. An optical pickup device as claimed in claim 1, wherein said first and second laser light sources are positioned opposite to each other by interposing said beam splitter between them, said beam splitter has two planes forming right angles with each other such that said two planes respectively face with said first and second laser light sources to allow said beams radiated from said first and second laser light sources to perpendicularly reflect and then to advance in the same direction, said optical disc is arranged onto the path of the advancing beam, and a photodetector is arranged onto said path of said beam for allowing said beam reflected from said optical disc to return to said beam splitter and allowing said returned beam to be received into said photodetector after being transmitted through said beam splitter.

3. An optical pickup device as claimed in claim 1, comprising first and second diffraction gratings respectively installed between said first and second laser light sources and said beam splitter for controlling tracking and focusing.

4. An optical pickup device as claimed in claim 1, wherein said selective light-transmitting part is comprised of a circular light-transmitting plate of which peripheral part is shaped as a ring.

5. An optical pickup device as claimed in claim 1, wherein a difference between said spot sizes focusing on said disc is adjustable by properly selecting said wavelengths of said laser beam.

6. An optical pickup device comprising:

a first hologram device having a first laser light source for generating laser beam of first wavelength, a first hologram grating for transmitting said beam emitted from said first laser light source and diffracting to radiate said beam incident after being reflected from an optical disc, and a first photodetector for receiving said beam diffracted by said first hologram grating;

a second hologram device having a second laser light source for generating laser beam of second wavelength, a second hologram grating for transmitting said beam emitted from said second laser light source and diffracting to radiate said beam incident after being reflected from said optical disc, and a second photodetector for receiving said beam diffracted by said second hologram grating;

a beam splitter arranged onto an optical path of said beams generated from said first and second laser light sources for reflecting said laser beam of first wavelength and transmitting said laser beam of second wavelength, whereby said laser beam of first wavelength is reflected and said laser beam of second wavelength is transmitted to form an identical beam which then proceeds toward said optical disc, and said beam reflected from said optical disc is returned to said beam splitter so as to lead said laser beam of first wavelength in said returned beam to be received into said first photodetector after being reflected from said beam splitter and said laser beam of second wavelength in said returned beam to be received into said second photodetector after being reflected from said beam splitter;

a selective light-transmitting part installed in front of said optical disc and formed by an inner circular part for transmitting only said laser beam of first wavelength and a peripheral part for transmitting only said laser beam of second wavelength; and an objective lens for focusing said laser beam advancing toward said optical disc onto said optical disc.

7. An optical pickup device as claimed in claim 6, wherein said beam splitter has a property of totally reflecting said beam of first wavelength and totally transmitting said beam of second wavelength.

8. An optical pickup device as claimed in claim 6, wherein said beam splitter has a property of partially reflecting and partially transmitting said incident beam.

9. An optical pickup device as claimed in claim 6, wherein said selective light-transmitting part is comprised of a circular light-transmitting plate of which peripheral part is shaped as a ring.

10. An optical pickup device as claimed in claim 6, further comprising a first diffraction grating installed between said first laser light source and first hologram grating within said second hologram device for controlling tracking and focusing.

11. An optical pickup device as claimed in claim 6, further comprising a second diffraction grating installed between said second laser light source and second hologram grating within said second hologram device for controlling tracking and focusing.

12. An optical pickup device as claimed in claim 6, wherein a difference between spot sizes focusing on said disc is adjustable by properly regulating an outermost angle of incidence of said laser beam which is transmitted through the inner circular part of the selective light-transmitting part.

13. An optical pickup device as claimed in claim 6, wherein said difference between said spot sizes focusing on said disc is adjustable by properly selecting said wavelengths of said laser beam.

14. An optical pickup device for reproducing discs of two types with different densities by double beam focuses of different sizes comprising:

a hologram device having a first laser light source for generating laser beam of first wavelength, a second laser light source for generating laser beam of second wavelength, a hologram grating for transmitting said beam emitted from said first and second laser light sources and diffracting to radiate said beam incident after being reflected from an optical disc, and a photodetector for receiving said beam diffracted by said hologram grating;

a selective light-transmitting part installed in front of said optical disc and formed by an inner circular part for transmitting only said laser beam of first wavelength and a peripheral part for transmitting only said laser beam of second wavelength, wherein a difference between spot sizes focusing on said disc is adjustable by properly regulating an outermost angle of incidence of said laser beam which is transmitted through the inner circular part of the selective light-transmitting part; and an objective lens for focusing said laser beam advancing toward said optical disc onto said optical disc.

15. An optical pickup device as claimed in claim 14, wherein said selective light-transmitting part is comprised of a circular light-transmitting plate of which peripheral part is shaped as a ring.

16. An optical pickup device as claimed in claim 14, further comprising a diffraction grating installed between said laser light source and first hologram grating of said hologram device for controlling tracking and focusing.

17. An optical pickup device as claimed in claim 14, wherein said difference between said spot sizes focusing on said disc is adjustable by properly selecting said wavelengths of said laser beam.

18. An optical pickup device comprising:

first and second laser light sources for respectively generating laser beams of first and second wavelengths;

a beam splitter arranged onto an optical path of said beams generated from said first and second laser light sources for partially reflecting and partially transmitting said first and second laser beams such that said laser beam is partially reflected toward an optical disc and said beam incident after being reflected from said optical disc is partially transmitted;

a selective light-transmitting part including an inner circular part for transmitting only said laser beam of first wavelength and a peripheral part for transmitting only said laser beam of second wavelength;

an objective lens for focusing said laser beam proceeding toward said optical disc onto said optical disc;

light-receiving means for receiving said laser beam reflected from said optical disc; and first and second diffraction grating respectively installed between said first and second laser light sources and said beam splitter for controlling tracking and focusing, wherein said first and second laser light sources are disposed to oppose to each other by interposing said beam splitter between them, said beam splitter has two planes forming right angles with each other such that said two planes respectively face with said first and second laser light sources to allow said beams radiated from said first and second laser light sources to perpendicularly reflect and then to advance in the same direction, said optical disc is arranged onto the path of the advancing beam, and a photodetector is arranged onto said path of said beam for allowing said beam reflected from said optical disc to return to said beam splitter and allowing said returned beam to be received into said photodetector after being transmitted through said beam splitter.

19. An optical pickup device for reproducing discs of two types with different densities by double beam focuses of different sizes comprising:

first and second laser light sources for respectively generating laser beams of first and second wavelengths;

a beam splitter arranged onto an optical path of said beams generated from said first and second laser light sources for partially reflecting and partially transmitting said first and second laser beams such that said laser beam is partially reflected toward an optical disc and said beam incident after being reflected from said optical disc is partially transmitted;

a selective light-transmitting part including an inner circular part for transmitting only said laser beam of first wavelength and a peripheral part for transmitting only said laser beam of second wavelength;

an objective lens for focusing said laser beam proceeding toward said optical disc onto said optical disc;

light-receiving means for receiving said laser beam reflected from said optical disc; and first and second diffraction gratings respectively installed between said first and second laser light sources and said beam splitter for controlling tracking and focusing.

20. An optical pickup device as claimed in claim 19, wherein said selective light-transmitting part is comprised of a circular light-transmitting plate of which peripheral part is shaped as a ring.

21. An optical pickup device as claimed in claim 19, wherein said first and second laser light sources are positioned opposite to each other by interposing said beam splitter between them, said beam splitter has two planes forming right angles with each other such that said two planes respectively face with said first and second laser light sources to allow said beams radiated from said first and second laser light sources to perpendicularly reflect and then to advance in the same direction, said optical disc is arranged onto the path of the advancing beam, and a photodetector is arranged onto said path of said beam for allowing said beam reflected from said optical disc to return to said beam splitter and allowing said returned beam to be received into said photodetector after being transmitted through said beam splitter.

22. An optical pickup device as claimed in claim 19, wherein a difference between said spot sizes focusing on said disc is adjustable by properly selecting said wavelengths of said laser beam.

23. An optical pickup device for reproducing discs of two types with different densities by double beam focuses of different sizes comprising:

a hologram device having a first laser light source for generating laser beam of first wavelength, a second laser light source for generating laser beam of second wavelength, a hologram grating for transmitting said beam emitted from said first and second laser light sources and diffracting to radiate said beam incident after being reflected from an optical disc, and a photodetector for receiving said beam diffracted by said hologram grating, wherein a difference between said spot sizes focusing on said disc is adjustable by properly selecting said wavelengths of said laser beam;

a selective light-transmitting part installed in front of said optical disc and form ed by an inner circular part for transmitting only said laser beam of first wavelength and a peripheral part for transmitting only said laser beam of second wavelength, wherein a difference between said spot sizes focusing on said disc is adjustable by properly selecting said wavelengths of s aid laser beam; and an objective lens for focusing said laser beam advancing toward said optical disc onto said optical disc.

24. An optical pickup device as claimed in claim 23, wherein said selective light-transmitting part is comprised of a circular light-transmitting plate of which peripheral part is shaped as a ring.

* * * * *